United States Patent
Schick et al.

[11] Patent Number: 5,991,130
[45] Date of Patent: *Nov. 23, 1999

[54] DISK CARTRIDGE ANTI-RATTLE MECHANISM

[75] Inventors: Brian R. Schick, Eden; Allen T. Bracken, Layton; Edward L. Rich; Wayne A. Sumner, both of Ogden, all of Utah

[73] Assignee: Iomega Corporation, Roy, Utah

[ * ] Notice: This patent is subject to a terminal disclaimer.

[21] Appl. No.: 09/154,872

[22] Filed: Sep. 17, 1998

Related U.S. Application Data

[63] Continuation of application No. 08/834,188, Apr. 15, 1997, Pat. No. 5,862,026, which is a continuation of application No. 08/550,818, Oct. 31, 1995, Pat. No. 5,650,899, which is a continuation-in-part of application No. 08/477,764, Jun. 7, 1995, abandoned.

[51] Int. Cl.$^6$ .................................................... G11B 23/03
[52] U.S. Cl. ............................................................. 360/133
[58] Field of Search ........................... 360/133; 369/270, 369/289, 290, 291

[56] References Cited

U.S. PATENT DOCUMENTS

| | | | |
|---|---|---|---|
| 4,320,430 | 3/1982 | Vogt | 360/133 |
| 4,400,748 | 8/1983 | Bauck et al. | 360/99 |
| 4,532,564 | 7/1985 | Larson et al. | 360/97 |
| 4,559,575 | 12/1985 | Noto et al. | 360/133 |
| 4,608,617 | 8/1986 | Oishi et al. | 360/133 |
| 4,688,127 | 8/1987 | Oishi et al. | 360/132 |
| 4,864,452 | 9/1989 | Thompson et al. | 360/133 |
| 4,879,621 | 11/1989 | Chamberlin et al. | 360/133 |
| 4,901,173 | 2/1990 | Jones et al. | 360/99.04 |
| 4,943,880 | 7/1990 | Muehlhausen et al. | 360/133 |
| 5,247,511 | 9/1993 | Koike et al. | 369/263 |
| 5,444,586 | 8/1995 | Iftikar et al. | 360/99.12 |
| 5,535,081 | 7/1996 | Nelson et al. | 360/133 |
| 5,650,899 | 7/1997 | Schick et al. | 360/133 |
| 5,862,026 | 1/1999 | Schick et al. | 360/133 |

FOREIGN PATENT DOCUMENTS

| | | |
|---|---|---|
| 369651 | 5/1990 | European Pat. Off. |
| 59-8173 | 1/1984 | Japan . |
| 62-298980 | 12/1987 | Japan . |
| 1-019572 | 1/1989 | Japan . |
| WO 89/08312 | 9/1989 | WIPO . |

*Primary Examiner*—William R. Korzuch
*Attorney, Agent, or Firm*—Woodcock Washburn Kurtz Mackiewicz & Norris LLP

[57] ABSTRACT

A cartridge for a magnetic disk drive has a clamping mechanism which is actuated as the door to the cartridge is closed when the cartridge is removed from the drive. The door covers the opening through which the cartridge is accessed by read/write heads. When the cartridge is removed from the drive, the mechanism of the present invention clamps the recording disk against the cartridge shell to prevent rattle, which might otherwise damage the recording disk.

11 Claims, 9 Drawing Sheets

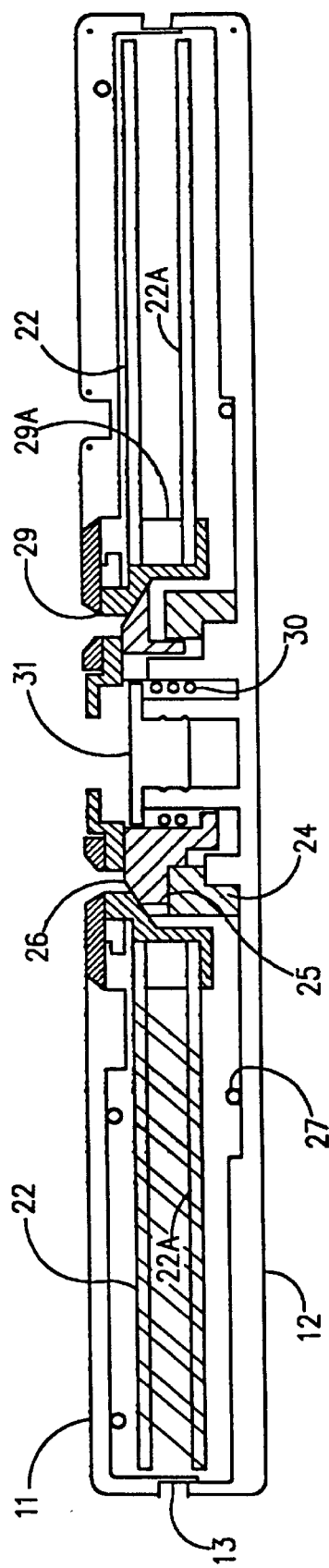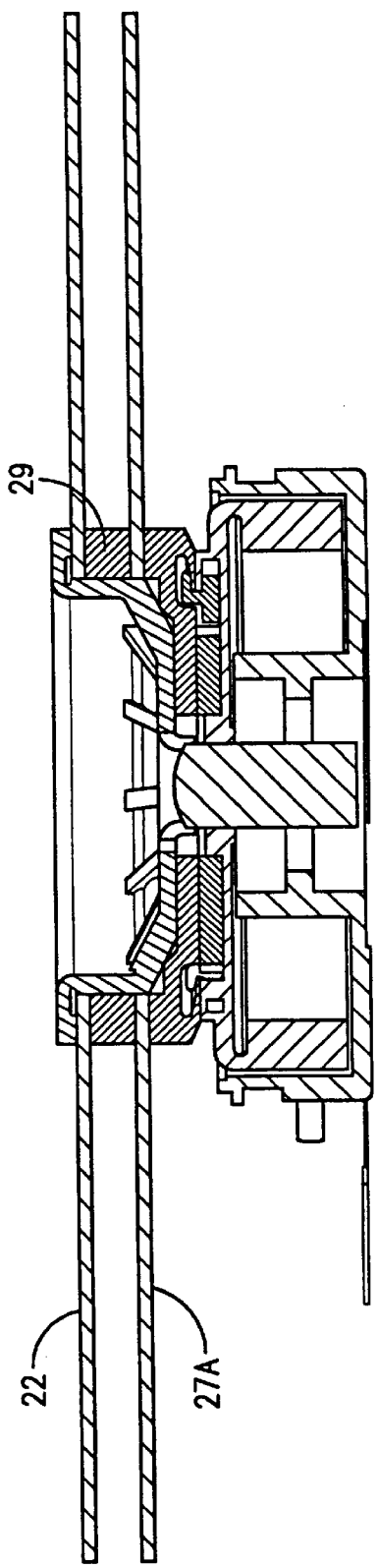

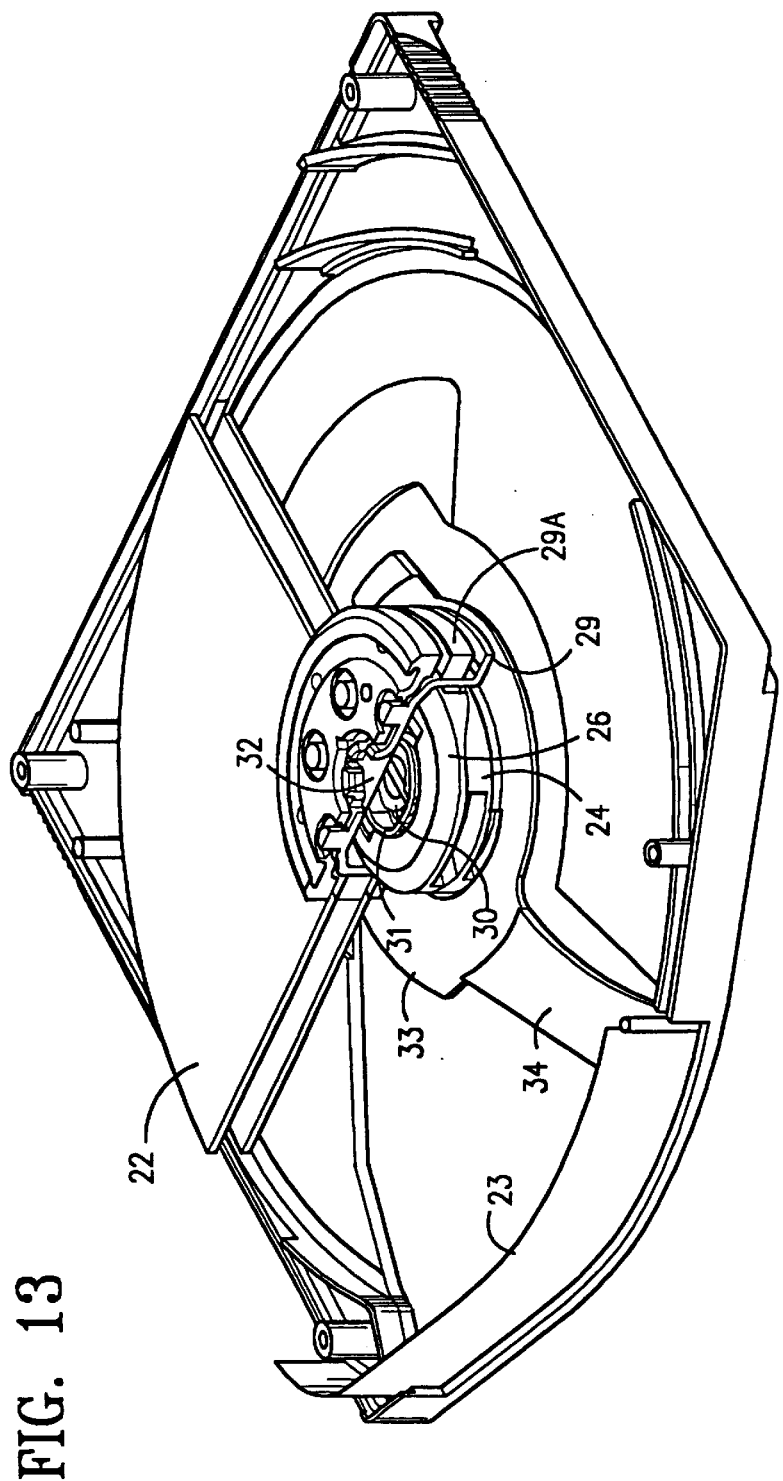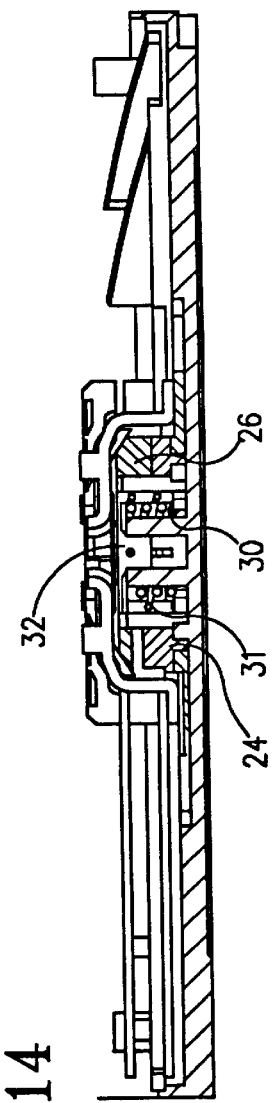
FIG. 13
FIG. 14

DISK CARTRIDGE ANTI-RATTLE MECHANISM

RELATED APPLICATION

This application is a continuation of U.S. application Ser. No. 08/834,188 filed Apr. 15, 1997, now U.S. Pat. No. 5,862,026 which is a continuation of U.S. application Ser. No. 08/550,818 filed Oct. 31, 1995, now U.S. Pat. No. 5,650,899 which was a continuation-in-part of U.S. appliciation Ser. No. 08/477,764 filed Jun. 7, 1995, now abandoned.

BACKGROUND OF THE INVENTION

This invention relates to data storage drives and more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748-Bauck, et al and related patents to the common assignee show such drives using Bernoulli stabilized flexible disks. U.S. Pat. No. 4,901,173-Jones et al and related patents to the common assignee, show improvements which relate to so-called "half height" drives.

The cartridges for these drives have a door which closes the cartridge when it is removed from the drive. This prevents debris from contaminating the magnetic recording medium when the cartridge is not in the drive. When the cartridge is inserted into the drive, this door slides to an open position to provide access for the magnetic recording heads to engage the recording medium.

When the cartridge is removed from the drive, it is often subject to rough handling. During handling, physical contact of the disk with the shell may damage the disk, particularly if the disk and cartridge shell are subject to excessive "rattling".

It is an object of the present invention to provide a device which clamps the disk to the cartridge shell when the cartridge is removed from the drive to prevent rattling of the cartridge.

SUMMARY OF THE INVENTION

In accordance with the present invention, a clamping mechanism in a data storage cartridge is actuated when the cartridge is removed from the drive. The mechanism restrains the recording medium to prevent rattling.

The clamping mechanism is driven by the motion of the sliding door. When the door is closed (cartridge out of drive) the mechanism expands and restrains the media from rattling inside the cartridge during handling. When the door is opened (cartridge inserted in the drive) the mechanism contracts such that it is free of the hub and the media is free to rotate.

The mechanism is attached to the sliding door by means of an actuating wire which provides a spring coupling to allow for mechanism over travel at both ends of the sliding stroke as well as compliance to account for relative changes in the distance between the mechanism and sliding door attachment point as the door travels through its stroke. In a preferred embodiment, a member rotatable about the axis of the recording medium has an arm connected to the door and attaches the sliding door to the mechanism. A wire in an opening in the terminal end of the arm telescopes into and out of the opening as the door travels through its stroke.

The clamping mechanism includes a rotating cam which rotates in the same axis as the media, a translating cam follower, a return spring, and an actuating wire, or arm, which connects the rotating cam to the motion of the sliding cartridge door. The mechanism is attached to the cartridge top shell half. It is situated in the cavity formed inside the media hub. The mechanism has two states; locked and unlocked. In the locked state the translating cam follower applies a force against the media hub effectively trapping the hub against the cartridge bottom shell. This force is sufficient to prevent the media from rattling against the cartridge shell halves when out of the drive. In the unlocked state the translating cam does not contact the hub thus allowing the media to spin freely.

The foregoing and other objects, features and advantages of the invention will be better understood from the following more detailed description and appended claims.

SHORT DESCRIPTION OF THE DRAWINGS

FIG. 4 is a section on the lines A—A of FIG. 3;

FIG. 5A is a section on the line A—A of FIG. 5 showing the cartridge in place on the motor;

FIG. 13 is a broken away perspective view of a preferred embodiment of the invention with the door in the closed position;

FIG. 14 is a cross-section of the cartridge of FIG. 13;

DESCRIPTION OF THE PREFERRED EMBODIMENT

Figure 2:
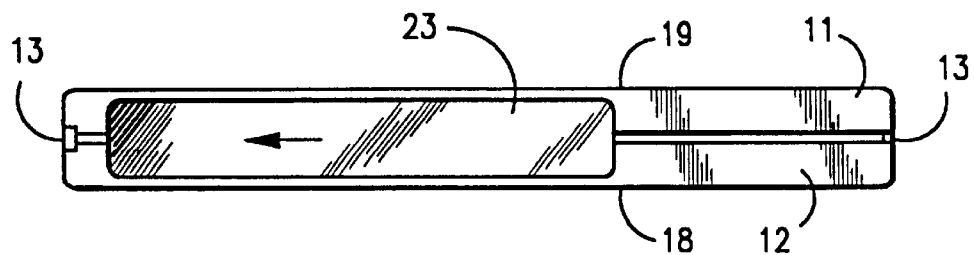
FIG. 2 is a front view of the cartridge.
Figure 1:
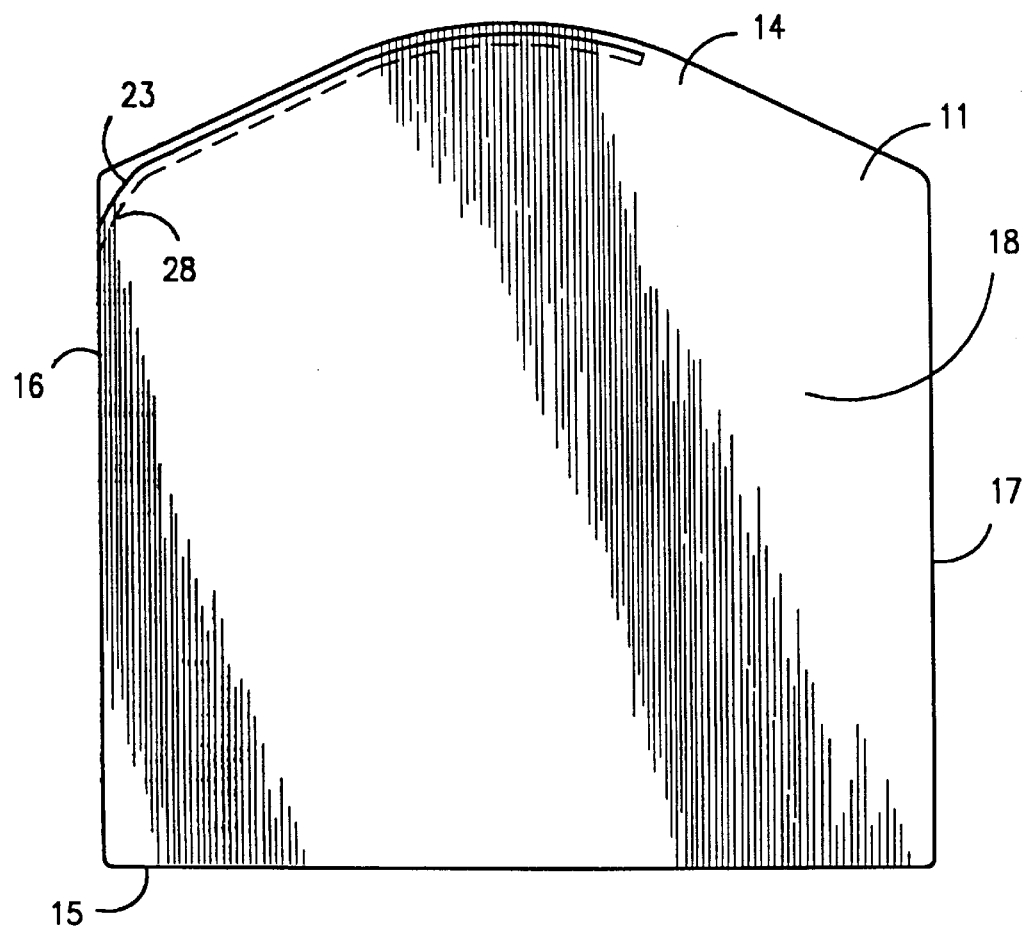
FIG. 1 shows a top view of the cartridge of the present invention.

FIGS. 1–4 show a cartridge having two half shells 11 and 12 joined together at 13. The cartridge has a front 14, a back 15 and two sides 16 and 17 between substantially flat, planar surfaces 18 and 19. An opening 20 in the front of the cartridge provides access by the read/write heads to the recording disks 22, 22A. A flexible door 23 covers the opening when the cartridge is removed from the drive.

Figure 6:
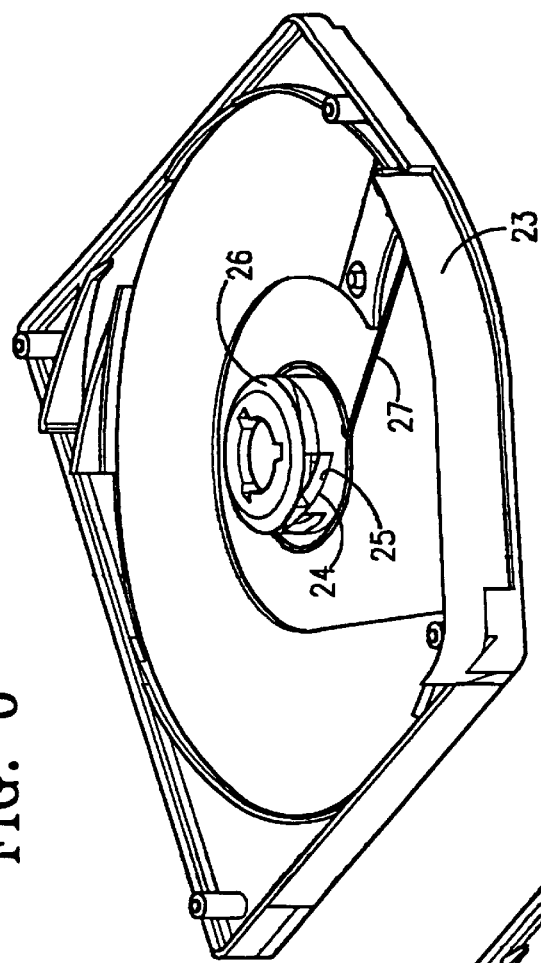
FIG. 6 is broken-away isometric view of the cartridge with the door closed.
Figure 6A:
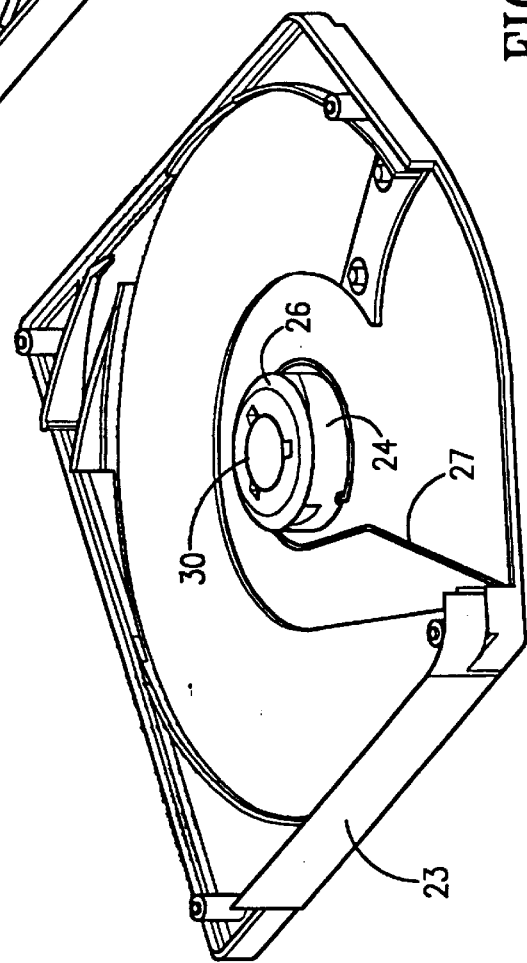
FIG. 6A is a view similar to FIG. 6 with the door open.

In accordance with the present invention, a clamping mechanism is actuated as the door 23 is opened and closed. This mechanism includes a rotating cam 24 which is rotatable on the same axis as the disks 22. The cam 24 has a surface 25 which extends axially as a function of the circumference of the cam. Translating cam follower 26 (FIG. 6) is moved axially by the surface 25 as the cam 24 rotates. This axial movement clamps the disk 22 against the bottom half of the shell 11 in the position shown in FIG. 4.

Figure 3:
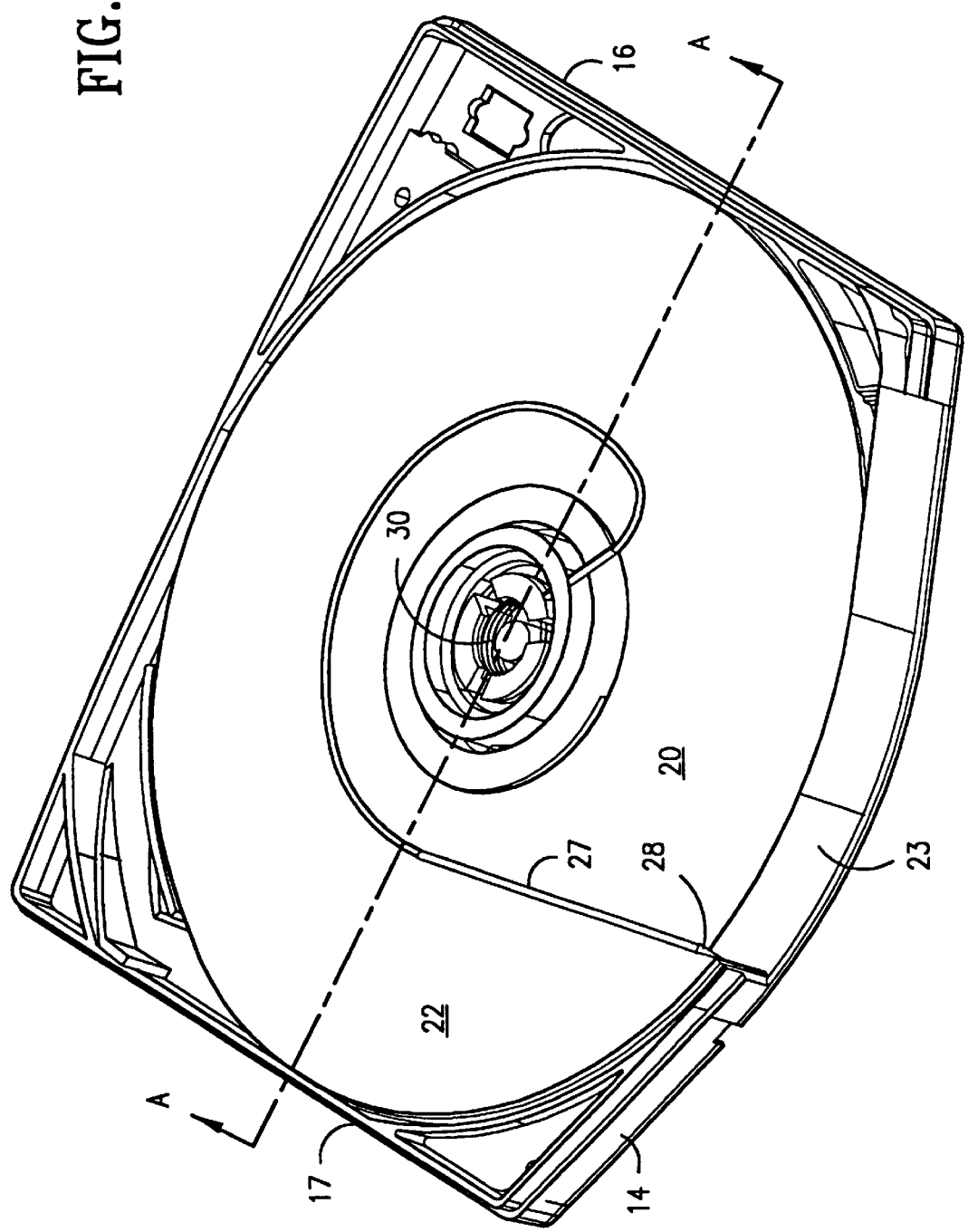
FIG. 3 is an isometric view of the cartridge with the top shell removed.

As shown in FIG. 3, the rotating cam 24 is connected to the door 23 by the actuating wire 27. Actuating wire 27 provides a spring coupling which allows for over-travel at both ends of the stroke of the door 23. Spring 27 also provides for relative changes in the distance between the cam 24 and the point 28 at which the actuating wire 27 is attached to the door 23. This distance varies as the door travels through its stroke.

Figure 5:
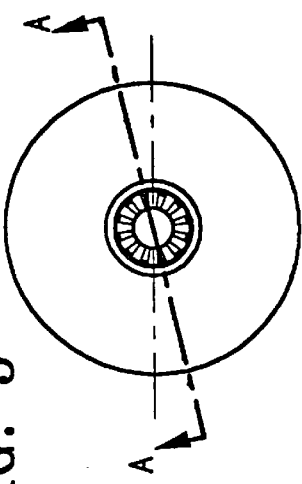
FIG. 5 is a top view of the spindle motor.
Figure 7:
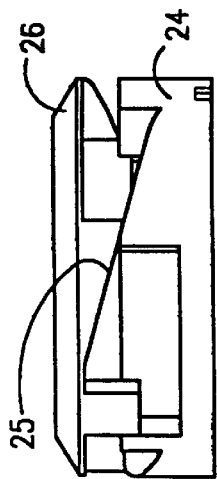
FIG. 7 is a side view of the cam/cam follower assembly with the cartridge door open.
Figure 8:
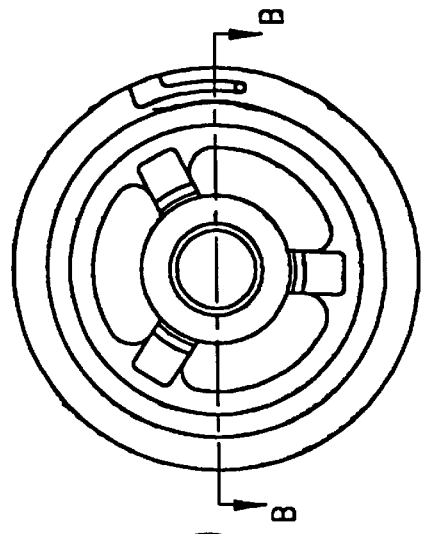
FIG. 8 is a top view of FIG. 7.
Figure 9:
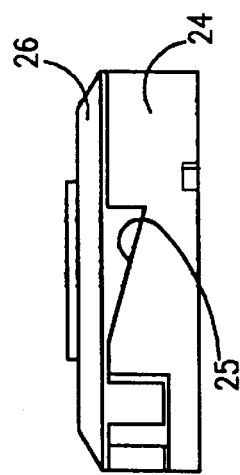
FIG. 9 is a side view of the cam/cam follower assembly with the cartridge door in the open position.
Figure 10:
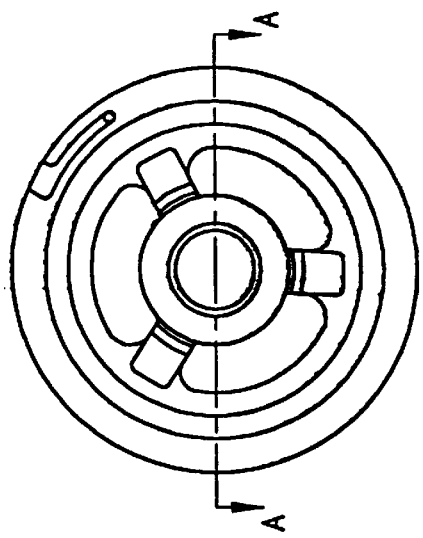
FIG. 10 is a top view of the assembly of FIG. 9.
Figure 8A:
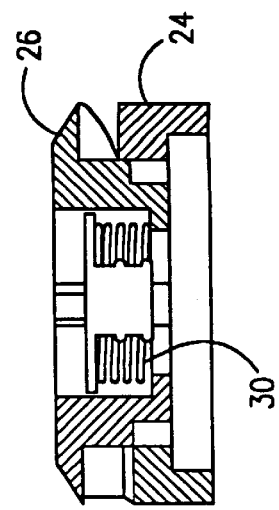
FIG. 8A is a section on the line A—A of FIG. 8.
Figure 10B:
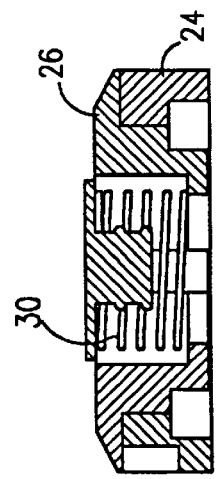
FIG. 10B is a section on the line B—B of FIG. 10.
Figure 12:
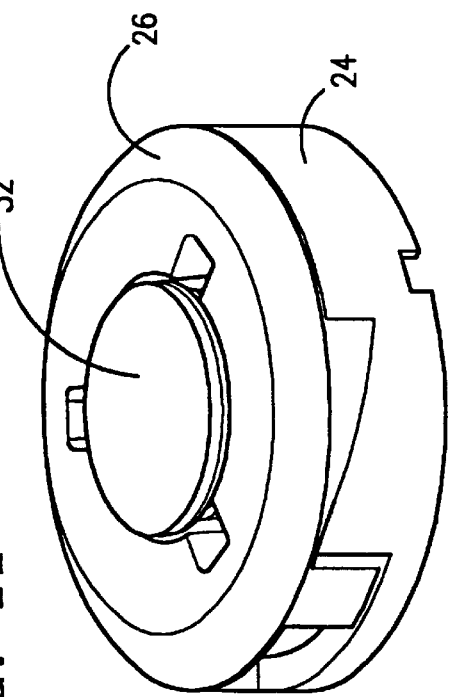
FIG. 12 is an isometric view of the cam/cam follower assembly with the cartridge door in the open position.

Recording disks 22 and 22A are mounted on a hub 29 (FIGS. 4 and 5A). A spacer 29A separates disks 22 and 22A. The cam follower 26 applies an axial force to the hub 29 to clamp the recording disk 22 against the bottom wall 11 of the shell.

Figure 11:
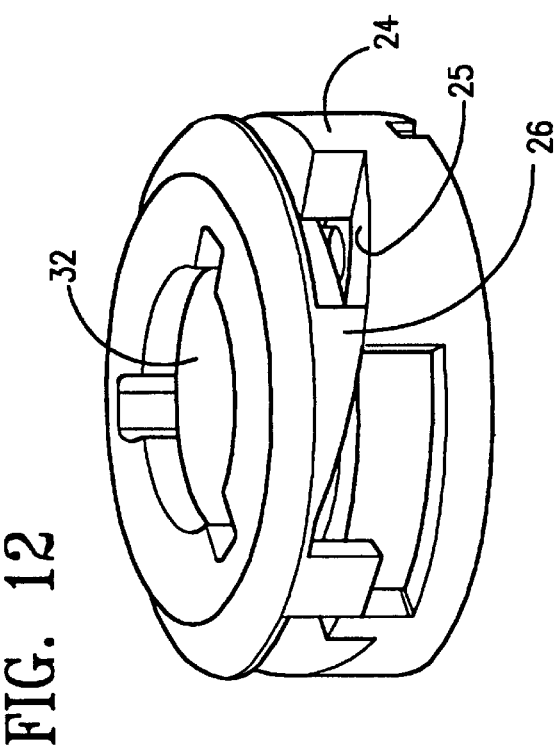
FIG. 11 is an isometric view of the cam/cam follower assembly with the cartridge in the open position.
Figure 11A:
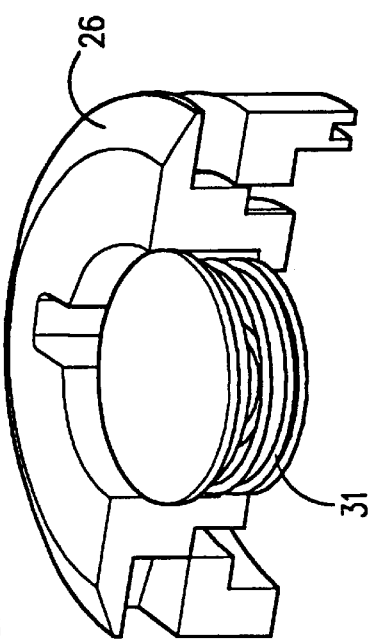
FIG. 11A is an isometric view of the section on the line A—A of FIG. 8.
Figure 12B:
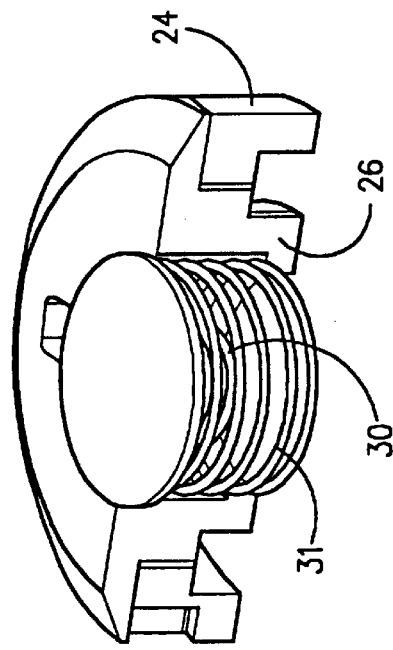
FIG. 12B is an isometric view of the section on the line B—B in FIG. 10.
Figure 15:
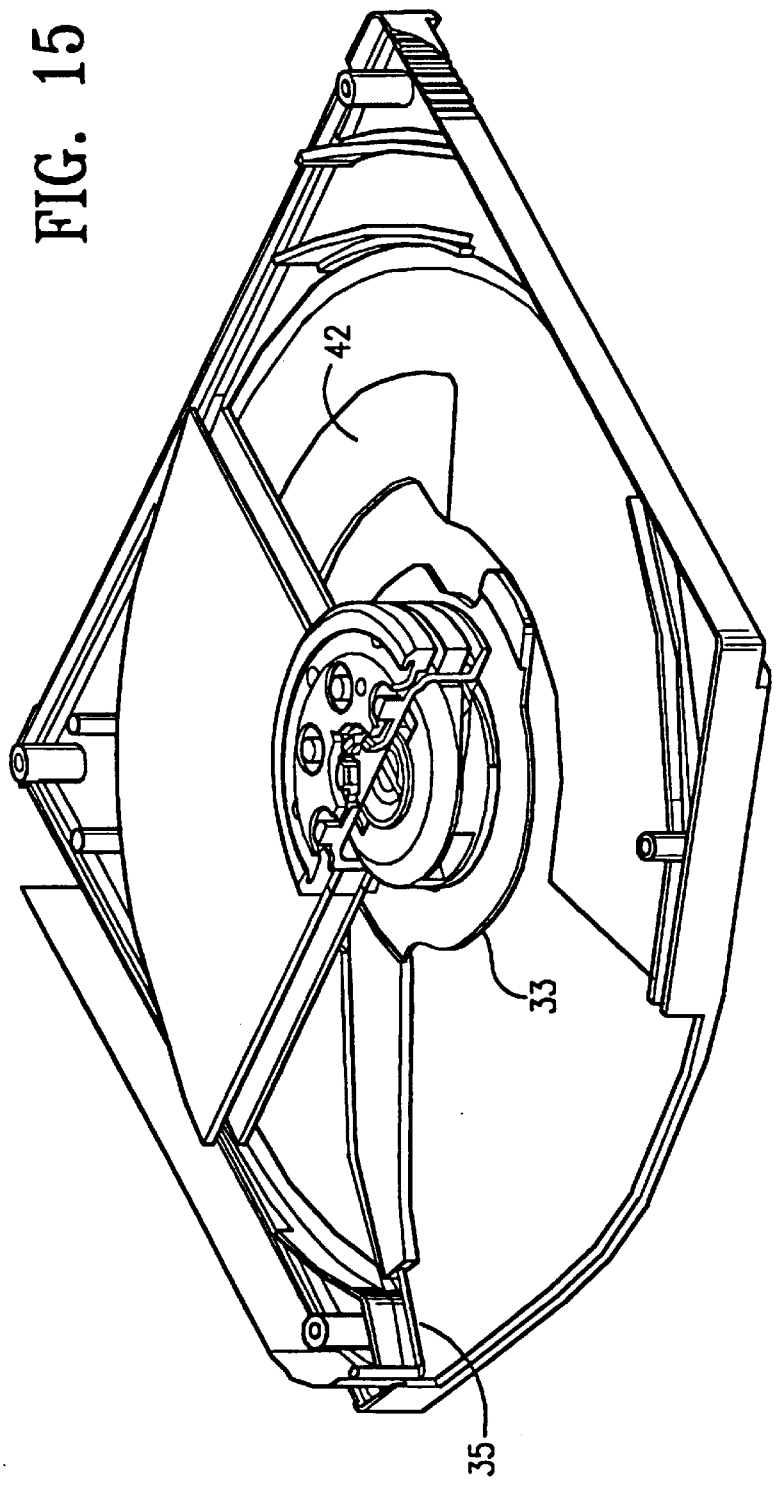
FIG. 15 is a broken-away perspective view of the cartridge of the preferred embodiment with the door in the open position.

A retaining spring 30 is positioned co-axially with the hub 29. The retaining spring 30 applies torsion to the hub 29 to return it to the position shown in FIG. 3 after it has been translated by the cam follower 26. A compression spring 31 applies bias to the cam follower 26 to return it to a spring 31, which is concentric with, but outside of, the spring 30, provides return force for the cam follower 26 to bring it into its open position. The springs 30 and 31 are both shown in FIG. 11A. The cartridge has a cavity at the center hereof in which the clamping mechanism of the present invention is positioned. A hub cap 32 retains the springs in this cavity.

Figure 16:
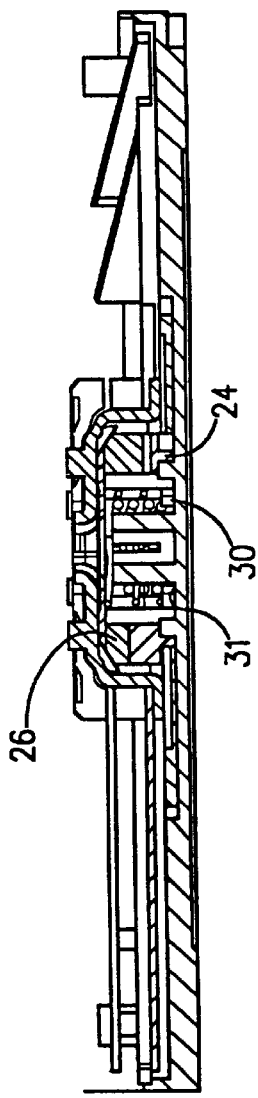
FIG. 16 is a cross-section of the cartridge of FIG. 15.
Figure 17:
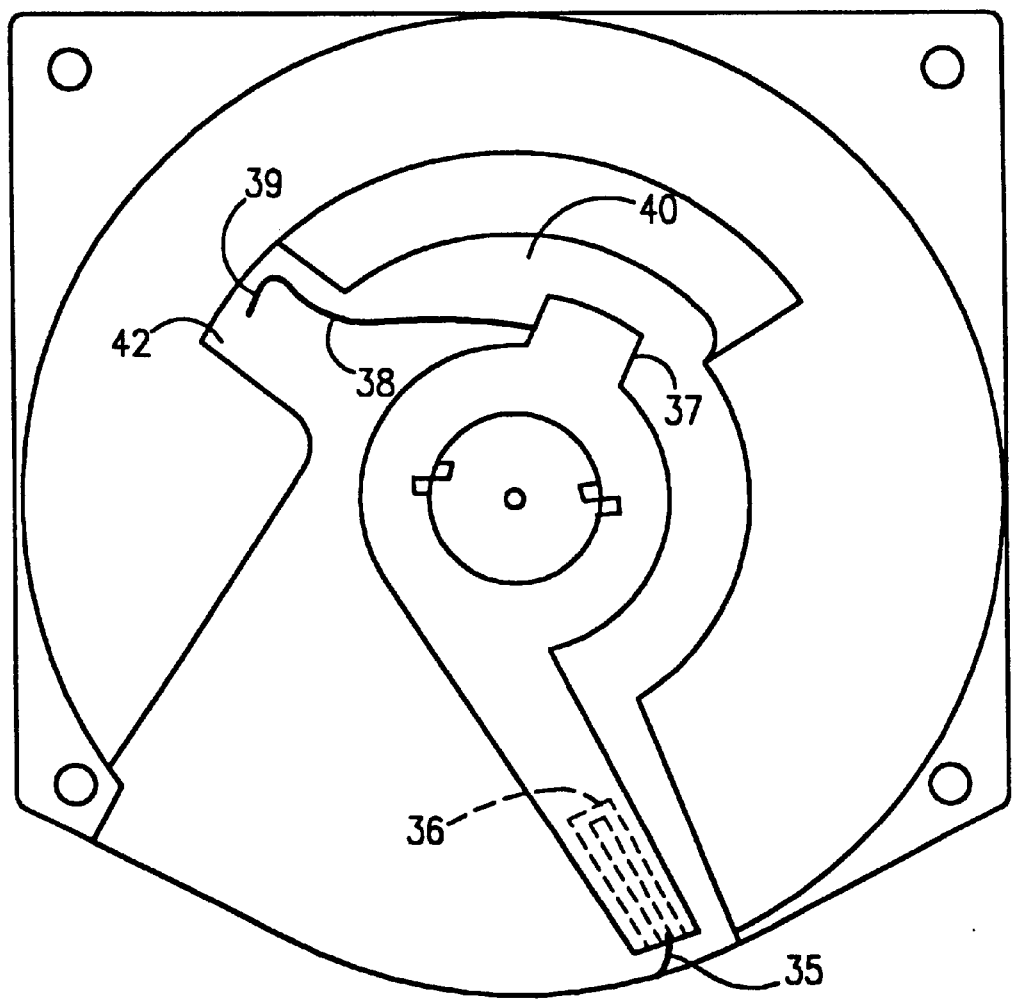
FIG. 17 is a top-plan view of the cartridge with the top shell and disks removed.

FIGS. 13–17 show a preferred embodiment of the invention in which the connection between the clamping mechanism and the door is a member 33 which is rotatable about the axis of the disks. Rotatable member 33 has an arm 34 extending radially toward the door 23. The terminal end of arm 34 is connected to the door by the wire 35. (FIGS. 16 ard 17). Wire 35 is disposed in an opening 36 in the arm. The wire telescopes into and out of the opening 36 as the door travels through its stroke. This accommodates the varying radial distance to the door throughout its stroke.

A protrusion 37 on the arm has a spring 38 which provides the closing force needed to close the door through the last portion of its travel. The spring 38 has a bent end 39 which travels in the arcuate path 40. The arcuate path has a notch 41 at the closing end thereof. As the bent end 41 travels along arcuate path 40, it drops into the notch 41 at the closing end of the door stroke. This provides the extra force necessary to close the door.

Arcuate path 40 is a depression in the face of the cartridge. This depression has a cover 42 so that the spring 38, and its bent end 39 travel in a closed path.

Various modifications may be made to the preferred embodiment. The appended claims are, therefore, intended to cover all such modifications within the true spirit and scope of the invention.

What is claimed is:

1. A cartridge for a drive in which read/write heads read/record data on a recording medium, comprising:

a shell having a front, a back, and two sides between top and bottom surfaces;

said recording medium being in said shell, disposed about an axis, and having a hub, said hub having a cavity at the center thereof;

said shell having an opening in the front thereof for access by said read/write heads from outside of said shell to said recording medium;

a door for covering said opening when said cartridge is removed from said drive;

a rotatable member disposed about the same axis as said recording medium, said rotatable member having an inclined surface which extends axially along a circumference thereof, said rotatable member being operatively connected to said door such that said member rotates about said axis in a first direction as said door is opened and rotates about said axis in a second direction as said door is closed; and a follower disposed within the cavity of said hub, the inclined surface of said rotatable member engaging said follower and (i) moving said follower axially upon rotation of said rotatable member in said second direction, whereby said hub is pressed against said shell when said door is closed, and (ii) moving said follower axially in an opposite direction upon rotation of said rotatable member in said first direction, whereby said hub is freed from being pressed against said shell when said door is opened.

2. The cartridge recited in claim 1 wherein said door has a stroke between the opened and the closed positions thereof, wherein said rotatable member is connected to said door by an actuating wire providing a spring coupling which allows for over-travel at both ends of said stroke of said door.

3. The cartridge recited in claim 2 wherein said door slides in tracks and wherein said spring coupling provides tolerance for relative changes in the distance between said rotatable member and the point at which said actuating wire is attached to said door, as said door travels through its stroke.

4. The cartridge recited in claim 1 further comprising:

a retaining spring positioned co-axially with said hub, said retaining spring applying bias to said hub to return it after it has been moved axially by said follower.

5. The cartridge recited in claim 1 wherein said rotatable member is connected to said door by a coupling member rotatable about the axis of said recording medium.

6. The cartridge recited in claim 5 wherein said coupling member has an arm extending radially toward said door, the terminal end of said arm being connected to said door.

7. The cartridge recited in claim 6 and further comprising:

a wire connecting the terminal end of said arm to said door, said wire being disposed in an opening in the terminal end of said arm, said wire telescoping into and out of said opening as said door opens and closes.

8. The cartridge recited in claim 1 further comprising a spring for returning said door to a closed position when said cartridge is removed from the drive.

9. The cartridge recited in claim 1, wherein the front of said shell has a convex portion that protrudes outwardly from the forward ends of the two sides.

10. The cartridge recited in claim 1 wherein said shell is symmetrical about a plane bisecting said shell at a midpoint between the two sides, and extending parallel to said sides and perpendicular to the top and bottom surfaces of said shell.

11. The cartridge recited in claim 1, wherein said recording medium is held in a clamped position whenever said door is in said closed position.

* * * * *